Dec. 19, 1933.  C. L. EKSERGIAN ET AL  1,939,769
WHEEL STUD
Filed Jan. 2, 1931    2 Sheets-Sheet 1
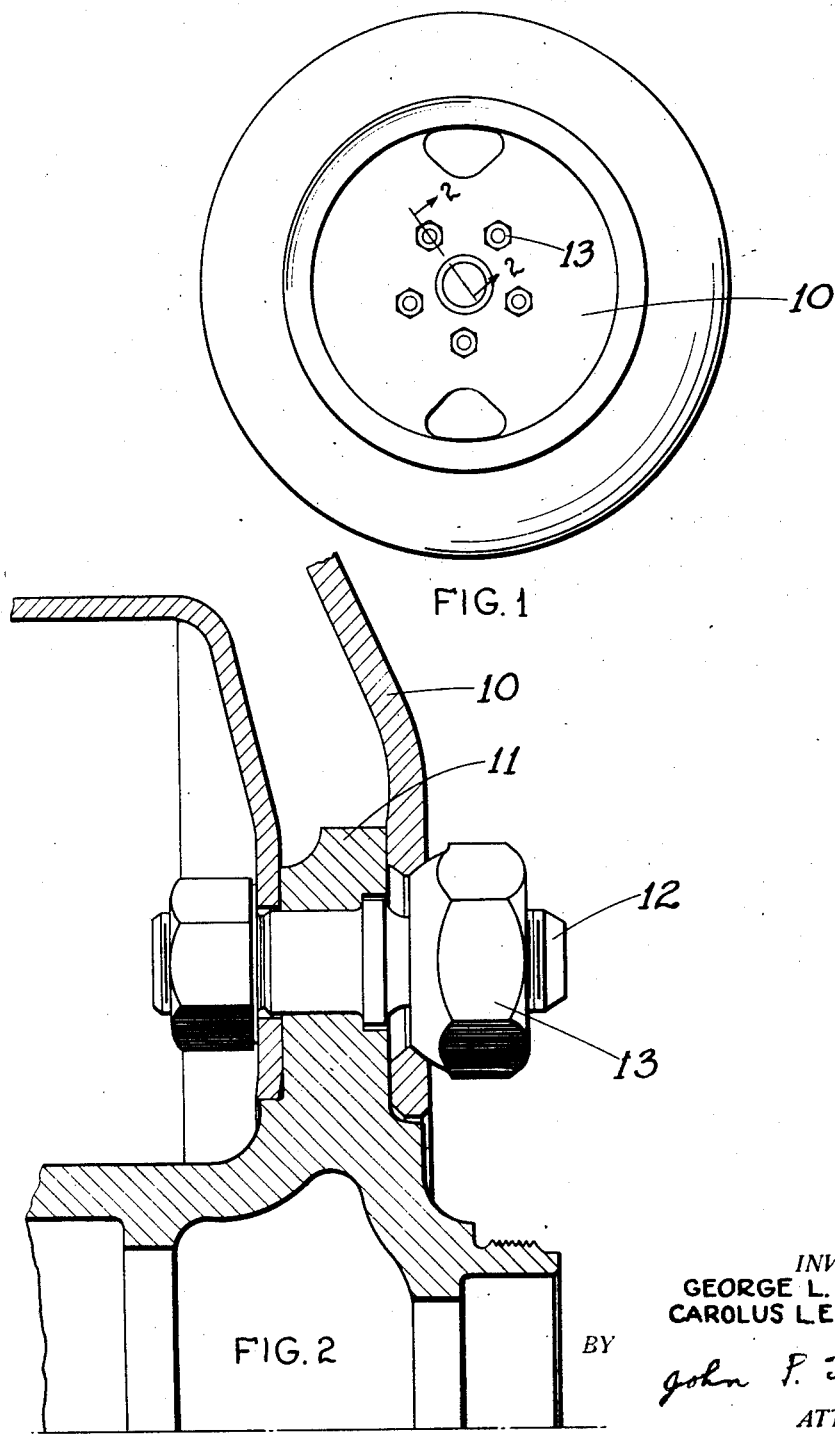
INVENTORS,
GEORGE L. KELLEY
CAROLUS L. EKSERGIAN
BY John P. Tarbox
ATTORNEY.

Dec. 19, 1933.   C. L. EKSERGIAN ET AL   1,939,769
WHEEL STUD
Filed Jan. 2, 1931   2 Sheets-Sheet 2

INVENTORS,
GEORGE L. KELLEY
CAROLUS L. EKSERGIAN
BY
ATTORNEY.

Patented Dec. 19, 1933

1,939,769

UNITED STATES PATENT OFFICE 1,939,769

WHEEL STUD

Carolus L. Eksergian, Detroit, Mich., and George L. Kelley, Philadelphia, Pa., assignors to Budd Wheel Company, Philadelphia, Pa., a corporation of Pennsylvania Application January 2, 1931. Serial No. 506,210

5 Claims. (Cl. 301—9)

Disc wheels of the prior art, and more particularly, wheels of heavy vehicles such as trucks and buses, have imposed very severe stresses upon the studs and nuts designed to secure them to vehicle hubs, and a very serious problem has accordingly arisen incident to the frequent breakage of these studs in service. It has been the primary object of our invention to obviate this breakage by introducing a factor of increased flexibility into the studs. We have attained this flexibility by increasing the free length of the studs extending axially outwardly between the hub flange and the securing nuts, and further by reducing the cross sectional area of the studs in the neighborhood of their point of securement to the hub flange.

In the drawings,

Figure 1 is a side elevation of our improved wheel.

Figure 2 is a section on line 2—2 of Figure 1.

Figure 3:
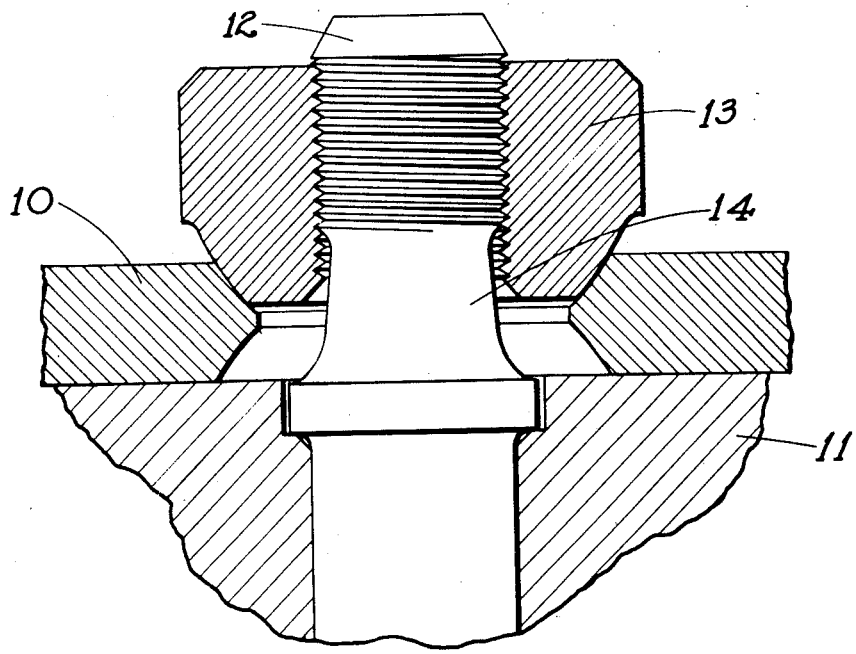
Figure 3 is a enlarged detail section through a nut, and a portion of a disc wheel and hub flange.

Referring to drawings by reference characters, 10 indicates a disc wheel which is secured to a hub flange 11, by means of a series of axially extending studs, 12, coacting with annularly arranged series of nuts, 13 adapted to clamp the disc wheel to hub flange.

According to our improved invention we form the studs and nuts in such a manner as to leave a substantial free length of stud between the zone of bearing within the hub flange and its first point of engagement with threads on the nut. In order to achieve this result we have undercut the stud for a substantial distance axially outwardly of its bearing within the hub flange, as indicated at 14. There is thus no positive engagement between the stud and nut for a substantial axial distance outwardly of this bearing. The undercutting of the stud gives the further advantage of increasing its flexibility in this zone at the same time that it affords a greater length of stud adapted to flex upon the imposition of a side thrust thereupon. In order to further facilitate its flexure we have tapered the stud to gradually reduce its cross section outwardly of its bearing within the hub flange and thereby effect the most desirable conditions of flexure of the longitudinal elements of the stud relatively to each other.

Figure 4:
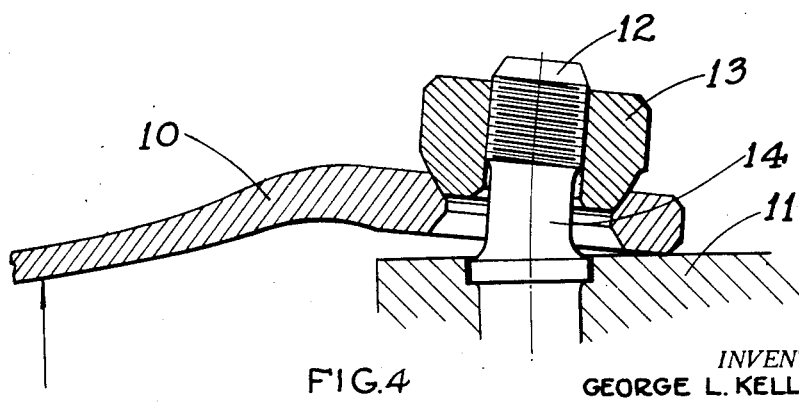
Figure 4 is a sectional view through the same parts, illustrating the action of our improved stud and nut combination under the influence of a lateral impact.

The action of our improved wheel is strikingly illustrated in Figure 4. When a side thrust, such as indicated by the illustration in Figure 4 is imposed upon the disc wheel there is naturally a tendency to distort the stud. In the stud of the prior art this tendency is counteracted by a relatively rigid stud member. This, of course, imposes a very severe stress upon the stud and frequently effects a breakage thereof. This failure of the stud to flex also tends to unseat the nut at its inner zone of engagement with the wheel body and thus imposes an additional stress upon the stud incident to the unequal seating of the nut upon the wheel body.

Figure 4 illustrates the action of our improved stud under the same conditions. Since the stud is able to flex over a substantial longitudinal extent, and since the stud is further undercut in a most desirable fashion to effect an even greater flexure than that naturally afforded by this additional free length, the stud is enabled to flex in such a manner as to avoid fracture. It will also be noted that with the stud of Figure 4 the nut is firmly seated under all normal side thrusts and thereby obviates the breakage of the stud heretofore induced by the uneven seating.

Modifications will be obvious to those skilled in the art, and we do not, therefore, wish to be limited except by the terms of our sub-joined claims as interpreted in the light of prior art.

What we claim is:

1. A vehicle wheel comprising in combination, a hub having a radially extending bearing seat, a wheel body, a plurality of annularly arranged threaded studs projecting axially outwardly from said seat, and a plurality of nuts adapted to coact individually with said studs, said studs being of reduced cross section in their longitudinal portions between said radial bearing seat and the zone of engagement of said nuts with the threads on said studs and said reduced portions extending axially outwardly of the studs for a substantial distance to be received within the body portions of the nuts when the parts are arranged in assembled position.

2. A vehicle wheel comprising in combination, a hub having a radially extending bearing seat, a wheel body, a plurality of annularly arranged threaded studs projecting axially outwardly from said seat, and a plurality of nuts adapted to coact individually with said studs, to secure said wheel body in place, said studs being of tapered reduced cross section in their longitudinal portions between said radial bearing seat and the zone of engagement of said nuts with the threads on said studs and said reduced portions extending axially outwardly of the studs for a substantial distance to be received within the body portions of the nuts when the parts are arranged in assembled position.

3. A vehicle wheel comprising in combination, a hub having a radially extending bearing seat, a wheel body, a plurality of annularly arranged threaded studs projecting axially outwardly from said seat, and a plurality of nuts adapted to coact individually with said studs, to secure said wheel body in place, said studs being undercut in their longitudinal portions between said radial bearing seat and the zone of engagement of said nuts with the threads on said studs, said undercut portions extending within the body portions of the nuts.

4. A vehicle wheel comprising in combination, a hub having a radially extending bearing seat, a wheel body, a plurality of annularly arranged threaded studs projecting axially outwardly from said seat, and a plurality of nuts adapted to coact individually with said studs, to secure said wheel body in place, said studs being undercut in their longitudinal portions for a substantial distance between said radial bearing seat and the zone of engagement of said nuts with the threads on said studs, the undercut portions of said studs being received within the body portions of the nuts when the wheel parts are arranged in assembled position.

5. A vehicle wheel comprising in combination, a hub having a radially extending bearing seat, a wheel body having a plurality of openings therein, a plurality of annularly arranged threaded studs projecting axially outwardly from said seat and through said openings, and a plurality of nuts adapted to coact individually with said studs and having portions adapted to be received within the openings in the wheel body to center the same, said studs being undercut in their longitudinal portions for a substantial distance between said radial bearing seat and the zone of engagement of said nuts with the threads on said studs, the undercut portions of said studs being received within said nuts and said studs presenting a substantial longitudinal portion free to flex upon the imposition of stresses upon said wheel body.

CAROLUS L. EKSERGIAN.
GEORGE L. KELLEY.